United States Patent [19]

Giddings et al.

[11] 4,149,184
[45] Apr. 10, 1979

[54] MULTI-COLOR VIDEO DISPLAY SYSTEMS USING MORE THAN ONE SIGNAL SOURCE

[75] Inventors: Gary M. Giddings; Glen G. Langdon, Jr., both of San Jose, Calif.; Alfred S. Malowany, Montreal, Canada; Robin Williams, San Jose, Calif.

[73] Assignee: International Business Machines Corporation, Armonk, N.Y.

[21] Appl. No.: 856,680

[22] Filed: Dec. 2, 1977

[51] Int. Cl.² .......................................... H04N 9/535
[52] U.S. Cl. ..................................... 358/81; 340/703; 340/366 CA; 340/706; 340/730; 340/750
[58] Field of Search ............................. 358/22, 81, 82; 340/324 AD, 366 CA

[56] References Cited

U.S. PATENT DOCUMENTS

| | | | |
|---|---|---|---|
| 3,911,148 | 10/1975 | Takeda | 340/324 AD |
| 3,995,312 | 11/1976 | Hubbard, Jr. | 358/81 |

Primary Examiner—Robert L. Richardson
Attorney, Agent, or Firm—Robert Bruce Brodie

[57] ABSTRACT

An improved video display system is provided in which two color images are combinable in a dynamic and self-determining fashion to provide improved contrast, comprehension and display versatility. Two separate video signals that are to be used in generating a single display are converted into sequences of digitally encoded picture elements (pixels). Control signals are generated that are dependent upon the data content of the elements in at least one of the sequences, and these signals are used to govern the mode of combination of the two video signals for individual pixel sets. For example a first video signal of digital character and having varying pixel intensity may be transformed into color values for a first pseudocolor display. A second video signal, derived from an analog source, is digitized and is also transformed into pseudocolor, concurrent with the dynamic generation in real time of the data dependent control signals. Such control signals may be incorporated in either or both of the digitized data sequences, and the second video signal may be digitized with or without adjustment of intensity ranges within variable limits. The two transformed digital signal sequences are then arithmetically or logically combined in accordance with the functions defined by the data dependent control signals. For example, the signals may be added, ANDed, ORed, averaged, subtracted, or one or the other can be blocked, and these functions can be varied, dependent upon the data, in incremental fashion within the display. Consequently, the contrast between the two color images can be selectively enhanced, the data contained in the images can be much more clearly depicted in graphical form, and special effects can be obtained in versatile and discretionary fashion.

17 Claims, 3 Drawing Figures

MULTI-COLOR VIDEO DISPLAY SYSTEMS USING MORE THAN ONE SIGNAL SOURCE

BACKGROUND OF THE INVENTION

A wide variety of systems are now known for combining two video images into a single display. Perhaps best known of these are the analog systems, in which special rasters may be generated, one picture may be superimposed on another, and differently generated images may be combined, or clearly distinguished. The functions usually performed, however, are essentially straightforward in character, such as the generation of split images, the superimposition of an individual against a background, and the display of a character message in a contrasting color against a changing video background. A number of systems are also known and in use for generating pseudocolor displays for digitally generated messages and graphical displays, either under software control or as shown in U.S. Pat. No. 3,911,418.

With the continued development and enhancement of the capabilities of digital graphical display systems, however, such techniques do not enable full realization of the potential of a display, in terms of making the data readily and fully comprehensible to a viewer. For example, a modern data processing system can generate a simulated three-dimensional display of a building, vehicle or other structure, and show the structure as viewed from different angles. However, when the display itself is restricted to lines of one color and one intensity against a contrasting background of uniform color and intensity, the observer must himself visualize relationships in order to interpret the display, because no gradations, shadings or interactive effects can be incorporated. As is evident when one looks at a map in which different colors and intensity variations have been used to depict elevation gradients, vegetation and contrasting geographical features, significant features and relationships are much more readily discerned than in a monochromatic equivalent that seeks to present the same information. As another example, engineers and scientists now employ processors in conjunction with interactive display systems in a wide variety of design and analytical studies, in seeking to analyze the effect of different variables and parameters in a computer model of a system or device. A full color display which is capable of a wide range of subtle presentations of different images will be much more readily comprehensible than the typical trace display on a non-illuminated background, or line display on a color background.

Some workers in the art have made attempts at providing a greater degree of versatility, as evidenced by Eiselen in U.S. Pat. No. 3,976,982 and Gilbert et al. in *IEEE Transactions on Computers,* November 1976, pp. 1089–1100. In the system of U.S. Pat. No. 3,976,982, an image from a source is combined with an image stored in an accumulating memory under the program control of an external element or control interface, in accordance with instructions which must be externally supplied to the control interface via a signal path. This is essentially a static type of control, inasmuch as the external instruction dictates that a given function will be employed until a subsequent choice is made. Thus although a number of functions may be available, only one can be used at a time for the whole image. The same general characterization can be made of the system of the Gilbert et al. publication, which moreover is limited in the number of functions that can be performed.

SUMMARY OF THE INVENTION

Control of the manner of combination of two video signals for a display image is based upon the instantaneous value of one of the video signals at any point in time. Each video signal sequence is generated as a sequence of multi-color digital valued signals, accompanied by one or more data dependent control signal patterns. The two digital color signals are then arithmetically or logically combined in real time on a pixel-by-pixel basis in accordance with a function determined at that instant by the data dependent control signal. After combination or mixing, the signals provide intensity and color control for a color display.

In accordance with other features of the invention, and based upon a specific example of a system in accordance with the invention, a stream of digital values representing pixels of varying intensity in a digital raster are applied as addresses to a look-up table memory having a stored word for each address. Concurrently, an analog video signal, such as is derived from a closed circuit TV monitor, is converted to a corresponding digital value within a grey scale the limits of which may be varied as desired. The digitized signal is then transformed by a look-up table memory into sets of digital-valued color signals accompanied by dynamic digital control patterns that are dependent on the image data itself. These color signals are applied along with the set of color signals of digital origin to an arithmetic and logic unit, which may also be called a digital mixer, operating under the control of the data dependent control signals. The arithmetic and logic unit may perform, for each pixel as determined by the control signals, an adding, subtracting, blocking, averaging or other arithmetic or logic operation. This dynamic mixing of red, green and blue colors in data dependent fashion on a pixel-by-pixel basis enables the images to be presented with great subtlety and variety.

BRIEF DESCRIPTION OF THE DRAWINGS

A better understanding of the invention may be had by reference to the following description, taken in conjunction with the accompanying drawings, in which.

DETAILED DESCRIPTION

Figure 1:
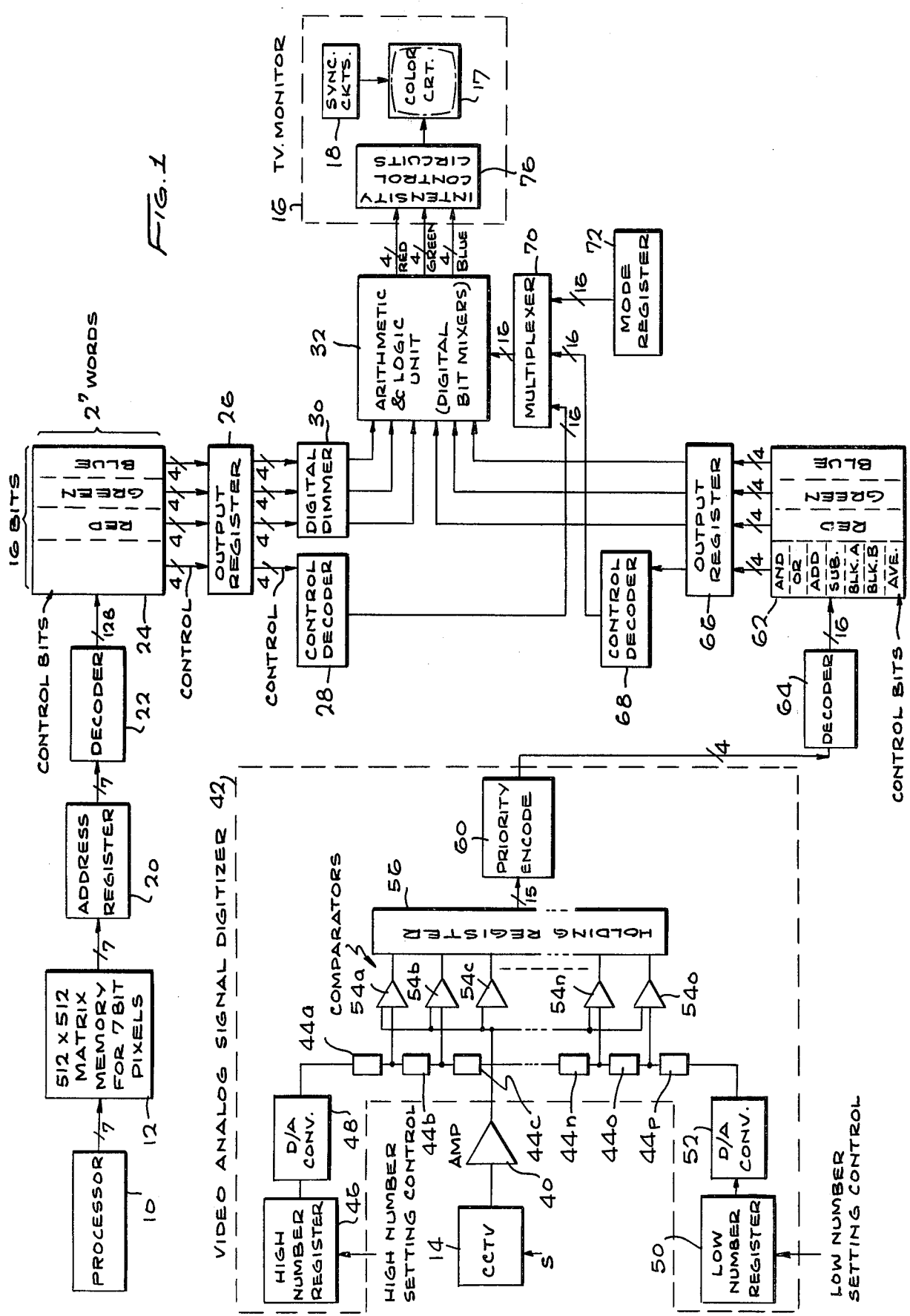
FIG. 1 is a block diagram of a video display system in accordance with the invention.

The system as described herein comprises a comprehensive color video display system for operation with two sources of image data, one of which may be a conventional digital image generator, referred to here simply as a processor 10. For descriptive purposes, a matrix memory 12 included in the system is separately shown, and comprises a 512 column × 512 row matrix memory, each location storing a 7 bit pixel and thus capable of 128 color combinations or grey scale levels. The analog image source is, in this example, a closed circuit TV camera 14, while the output display is to be generated on a TV monitor 16 including a CRT 17 and synchronizing circuits 18. The system is maintained in synchronism by conventional means which are not significant to the inventive concept and the details of which have accordingly been omitted for simplicity. Broadly speaking, however, the processor 10 clock may serve as the master synchronizing signal reference for the timing of data transfer and for vertical and horizontal scanning purposes in the video devices. The presence of the memory 12 enables the system to effect precise synchronization between the image signal trains. In the figures, the use of multiple lines between functional elements is designated by the employment of a diagonal across the line accompanied by a numeral or other notation indicating the number of lines that are there represented.

The digital image signal train is applied from the matrix memory 12 to an address register 20, the output signals (seven parallel lines) from the address register 20 being applied through a decoder 22 to a table look-up device or memory 24. Inasmuch as the system operates essentially in real time and data is transferred on a serial basis, read control and bit timing signals that may be applied to the different functional units have been omitted for simplicity. The output of the decoder 22 comprises 27, or a total of 128, output lines to address a corresponding number of word storage locations in the table look-up memory 24. The storage locations contain 4 bits each of red, green and blue color data and may also include 4 bits of control data although in the present example the control data used is primarily that contained in the analog signal channel. The table look-up memory 24 may comprise a prewired or program addressable type of storage, such as a read only memory, or a randomly addressable memory that may be distructively read but immediately rewritten. The 16 output bits from the memory 24, comprising the 12 color bits (and the 4 control bits where these are used), are applied to an output register 26, with the 4 control bits being converted to signals on 1 of 16 output lines in a control decoder 28. The color bits may be applied to what is here called a "digital dimmer" 30, which actually comprises a separate divider for each of the 4 bit color signals, and which can be set to divide each signal by unity, three-fourths, one-half, or one-quarter, so as to reduce the intensity of the signal. For this purpose, a "division control" input is utilized, and this may comprise either a manually selectable switch, processor control signals, or two selected bits in the control signal from the table look-up memory 24 may be used for this purpose. The three sets of 4 color input signals, with or without the optional digital dimming function, are applied to the arithmetic and logic unit 32, which unit is also referred to herein as containing digital bit mixers. The arithmetic and logic unit 32 is described in greater detail hereafter in conjunction with FIG. 2.

Corresponding sets of color intensity signals are also derived in an analog channel commencing with the closed circuit TV 14, signals from which are applied through an amplifier to a video analog signal digitizer 42. In the digitizer 42, a fixed number of adjustable signal amplitudes are utilized to define the grey scale range, from minimum to maximum. A chain of precision resistors 44a, 44b, 44c . . . 44p are coupled to a high and low voltage source respectively. The high voltage source is selectable in level, and provided by a first digital register 46, here referred to as a "high number register", which is settable to a selected value either by switch control or by program control to represent a desired maximum voltage for the voltage divider chain of resistors 44. The output from the high number register 46 is transformed into a corresponding analog level by a first digital-to-analog converter 48. Similarly, the minimum potential to be established for the other end of the voltage divider chain is provided by a low number register 50 controlling an associated digital-to-analog converter 52. By moving the maximum and minimum values further apart, the digital increments defined by the voltage divider chain are increased but a greater range is covered, while the converse may also be established. Because the absolute values of the limits may be moved up or down concurrently, both threshold values and the degree of resolution of the grey scale may be changed by the digitizer 42. Taps taken from the successive intermediate points of the voltage divider chain are applied to individual inputs of a series of comparators 54a, 54b, 54c . . . 54o, comprising operational amplifiers arranged as threshold sensitive devices which give a binary output signal to indicate whether the applied signal is above or below a preselected level. The outputs of the comparators 54 are applied to a holding register 56.

The 15 comparators 54 that are coupled between the midpoints of the resistors 44 in the voltage divider chain provide inputs through the holding register 56 to a priority encode circuit 60 which provides 4 bits of parallel encoded data with, for example, 1111 representing the maximum value and all voltage levels above that value, and 0000 defining the minimum value and all voltage levels in the subband below it. These parallel signals are applied to a second table look-up memory 62 having 16 words of 16 bits each, with 4 bits each being devoted to the red, green and blue colors respectively, and 4 bits being devoted to control data. An address encoder 64 is employed to select the appropriate word. The control data groupings have been labeled "AND", "OR", "add", "subtract", "block A", "block B", and "average" but with 4 different bits up to a total of 16 different functions are available. The table look-up function here performed provides a conversion to pseudocolor from grey scale black and white, either derived from the closed circuit TV 14 or from some other source, so that the ability to discriminate is substantially greater than with a single color. Output signals from the memory 62 are applied through an output register 66 to the arithmetic and logic unit 32 for the 12 color signals, and to a second control decoder 68, for the control signals. Both sets of control signals or combination bits from the decoders 28 and 68 are applied to a multiplexer 70, along with another set of signals from a mode register 72. The mode register 72, which may be manually set or operated under program control to generate functional control signals, provides the equivalent of a static or external control for the system. Whichever set, or combination of parts of sets, of control signals is utilized under selection control at the multiplexer 70, the sixteen output lines from the multiplexer govern the functions performed within the arithmetic and logic unit 32.

The output signals from the arithmetic and logic unit 32 comprise the digital, 4 bit valued, signals for red, green and blue respectively, and these are applied to intensity control circuits 76 in the TV monitor 16. The intensity control circuits 76 include digital-to-analog converters and conventional amplification circuits for modulation of display color intensity.

Figure 2:
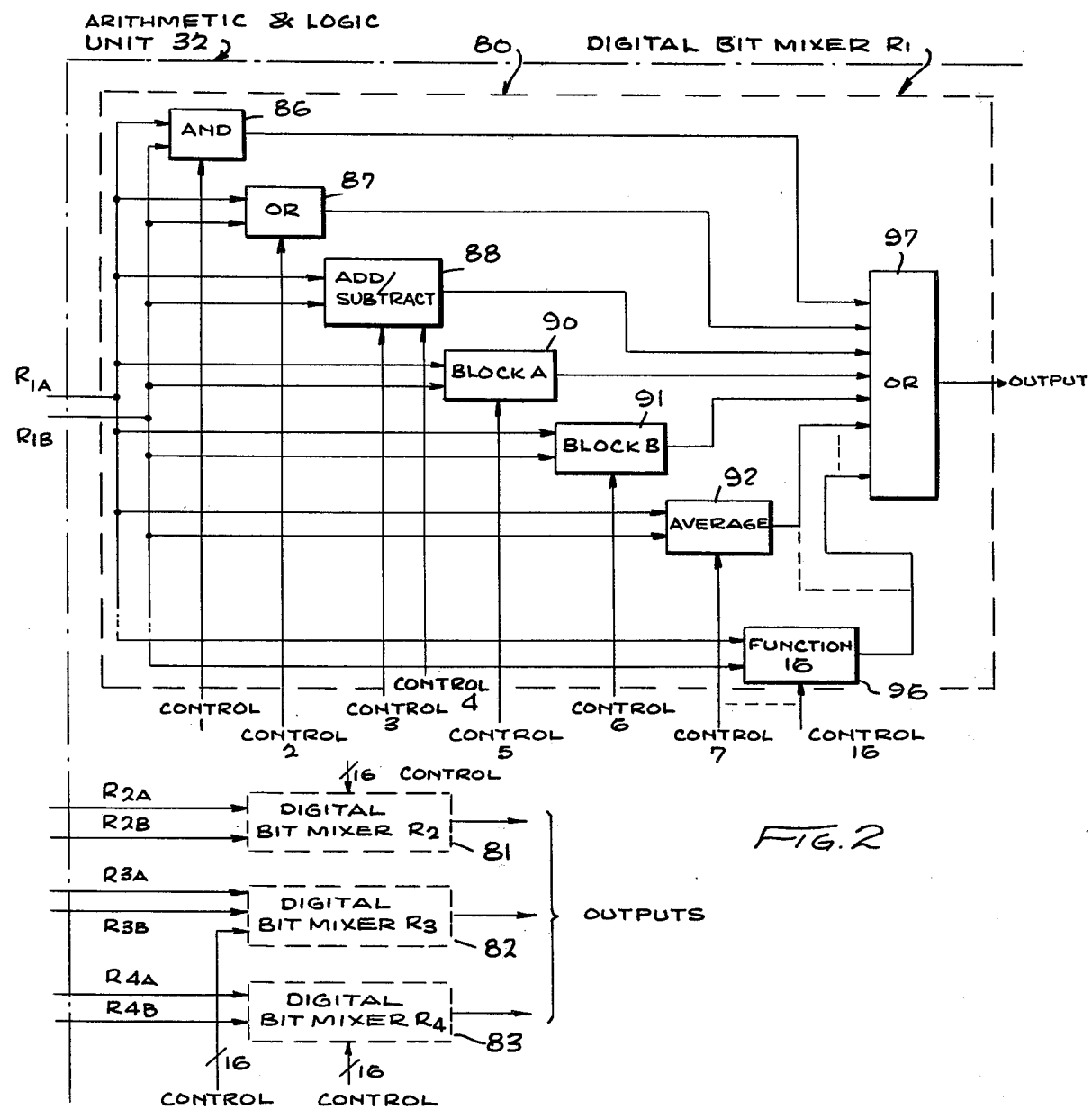
FIG. 2 is a block diagram of a portion of an arithmetic and logic unit that may be utilized in the system of FIG. 1.

Details of the arithmetic and logic unit 32 are shown in part in FIG. 2, which fragment relates only to the 16 possible control functions that may be exercised for each bit value of each color, such as the four bits $R_1$, $R_2$, $R_3$ and $R_4$ for each channel (A & B). In FIG. 2, the functions have been designated in various ways, but all represent some type of arithmetic or logic operation. The four depicted bit mixers 80, 81, 82, 83 each contain like functional gates or circuits, although only the $R_1$ bit mixer 80 is shown in some detail. Thus for the logical "AND" function, the two input signals $R_{1A}$ and $R_{1B}$ are applied to a three input AND gate 86 that also receives a control signal to effect the designated function for the same picture element. For the next picture element, the "OR" function provided by the circuit 87 may be desired, and the second control line is actuated, so that the circuit 87 responds to a signal on either input line. Similarly, EXCLUSIVE-OR and other logical functions may also be defined. Also included in this example are an add/subtract circuit 88, circuits 90 and 91 for blocking the A and B signals respectively, a circuit 92 for averaging the two signals, and, by way of illustration, an arbitrary function designated simply as "function 16". Where full addition, subtraction or averaging of each 4 bit value with a corresponding 4 bit color value is to be effected, conventional circuits providing carry between adder stages will be desired. Where the blocking signal function is employed, the corresponding input signal is simply gated off. Although the circuits are separately shown for ease of understanding, it will be apparent that these and many other functions could be established by a microprogram and that where hard wired circuits are to be used conventional logical design would substantially reduce the number of gating elements utilized.

The operation of the system may perhaps best be visualized initially in terms of the concurrent generation of two color images, each consisting of an array of distributed pixels derived from a sequence of coded bit-valued representations. The 7 bit digital characters from the processor 10 provide extremely finely resolved grey scale values which are used to address a corresponding word location in the table look-up memory 24. The chosen word location contains three different digitized color values, each 4 bits long, and may also contain the control or combinational bits, although others are used in this particular example. The output from the table look-up memory 24 is provided essentially in real time and represents the pseudocolor conversion of the input. Great variety is possible because of the number of words available in this memory, which permits essentially all colors, including white, to be generated, and with a wide range of intensities.

Concurrently, the analog signal from the CCTV source 14 is converted digital grey scale values at the comparators 54, in relation to increments within a range established by the high and low number registers 46, 50 respectively. Although a lower number of grey scale values is available (in this example) the ability to shift limits and adjust increments within the limits enables the contrast and intensity of the analog input to be altered to best advantage. When this input is converted to pseudocolor in the associated table look-up memory 62, it is read out concurrently with the accompanying control bit patterns in a coded sequence, and again in essentially real time fashion. Both digital coded sequences of color values for a pixel are then combined in dynamic dependence on the control signal pattern for the same pixel, within the arithmetic and logic unit 32. Although the analog channel is used for data dependent control in this example, the groups of combination bits taken from the other image input, or static control bits may be taken from the mode register 72, as selected at the multiplexer 70.

Substantial advantages for video display systems are realized from the real time digitizing and generation of color-valued signals which are then dynamically combined in a data dependent manner. The use of a table look-up memory in each image signal path transforms each image to a more readily interpreted form, even if the type of control remains static (e.g. if the whole images merely are combined in additive fashion). The ability of the video analog signal digitizer to alter the range and resolution of the grey scale permits selective modifidation of the video input for advantageous display purposes but is not required for use of the invention. However various advantages are derived, because low level backgrounds may be eliminated, or the contrast in a scene having low level illumination may be substantially enhanced.

Figure 3:
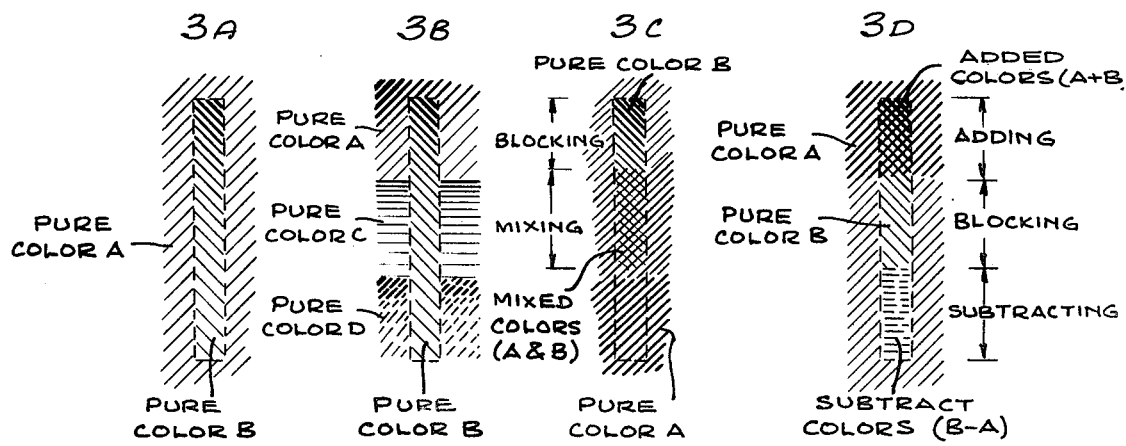
FIG. 3, comprising FIGS. 3A–3D respectively, includes graphical representations of different visual effects that may be provided by systems in accordance with the invention.

It is more significant, however, that dynamic control on a pixel-by-pixel basis enables different parts of an image to be colored in advantageous and different ways depending on data content and relationships. Referring to FIG. 3A, which represents a relatively simple condition, it may be seen that a background of a pure color A is to be viewed except where a pure color B from the other input exceeds a minimal level. Thus, as shown, in writing color B there is no mixing with color A, and the region of color B can be of varying intensity (as can the region of color A, although this is not shown). Consequently a line drawn in color B (e.g. red) appears to cut through the background of color A (e.g. green) and no color mixing results. Of course, the "pure" colors need not be a primary red, green or blue, but can be any appropriate color of the spectrum including white. FIG. 3A thus represents a blocking function, and could be accompanied by concurrent conversion of pure color B to a maximum level wherever it is to be written.

FIG. 3B shows that the blocking function can be independent of background, in that the varying intensity region of color B can be written without color mixing against a background of colors A, C and D generated during the pseudocolor transformation. Because of the dynamic control of increments of picture area, further variations may be introduced, based upon the intensity of one or the other of the images. Thus as seen in FIG. 3C, where color A is of less than a certain threshold in intensity, pure color B may be superimposed on a background of color A by blocking color A. At or above the chosen threshold for color A, the colors may be mixed (additively or subtractively) to give a different effect. As an extension of this capability, adding, blocking and subtracting functions can be used at different regions all dependent upon the intensity level of the signal in the channel corresponding to color A, as shown in FIG. 3D.

A typical specific example of how signals may variably be combined based upon the data content in the signals themselves involves the display of digitally generated characters and vectors on a map reference which may be derived from a closed circuit TV monitor. Lines and patterns of varying intensity are generated by the digital source but for best comprehension of the display it is not suitable to simply additively combine the signals. This would result in the lines having both different intensities and varying colors along their lengths. It is also not satisfactory for all purposes simply to block one of the signals so as to permit the lines to stand out more clearly, because there can be significant variations in the digital input. It may be desired to show only the highest intensity lines, and to leave the map image at its appropriate intensity where lines are not to be shown. In accordance with the invention these and other functions can be performed automatically and in real time.

EXAMPLE I

In order to provide a display in which characters and vectors generated in the digital channel starting with the processor 10 are uniquely presented relative to an analog image starting with the CCTV 14, a prearranged combination of control bits and color bit values is entered into the video look-up table 62. The video analog signal digitizer 42 is set to appropriate maximum and minimum values, and it is assumed that a pseudocolor analog display of three different colors is to be generated. It is also assumed for this example that the digitally generated images will be arithmetically combined in each of the separate color regions. Thus, the entry into the video look-up table 62 may employ the "add" function and provide a red color output in the address range of 0 to 5, may employ the green color output and the "subtract" control function in the address range of 6 to 10, and the blue color output together with the "add" control function for addresses from 11 to 15. Concurrently, the digital input is converted to a single color, or to a number of colors in a prearranged format in the video look-up table 24. As the analog signals are digitized, a pseudocolor output is generated consisting of the three selected colors in different areas. These areas are overwritten by the digitally generated patterns in different colors. Consequently, outstanding or significant features can readily be identified against the background.

EXAMPLE II

In this example and in Example III, it is assumed for convenience that the control bits are included in the video look-up table 24 in the digital channel instead of the video look-up table 62 in the analog channel. In this example, it is desired to provide sharply visible digitally generated characters and vectors against the analog pseudocolor image background. If the digital signal is divided into eight principal increments (0 to 7) and it is desired to display the digital signal clearly whenever the digital value is at increment levels 6 and 7, then the entries in the video look-up table 24 are written as follows:
A. Addresses 0 to 5 contain:
  1. Control bit section — "Block the digital input"
  2. Color bits — arbitrary, because to be blocked.
B. Addresses 6 and 7 contain:
  1. Control bit section — "Block the analog input"
  2. Color bits — establish maximum (e.g. 1111 level).

Consequently, the pseudocolor image of the map will appear at its normal intensity except where the digital lines are sufficiently bright, at which regions the digital lines will appear in full brightness, without color mixing with the pattern of the map. Furthermore, the map display is generated throughout in pseudocolor in accordance with any rule that is established and entered into the second video look-up table 62. Obviously the options of having the map only in graduated tones of one color and having the superimposed digitally generated line patterns in one color, or in different colors, are readily available.

EXAMPLE III

Consider another situation in which the analog signal has been converted to three color signals, red, green and blue, each with intensity values of 0 to 15. The digital signal initially has intensity values of 0 to 127, but is applied to the table look-up memory 24 so as to generate a pseudocolor signal of corresponding intensity variations, but in three different colors, each scaled from 0–15. However, in this situation it is desired that when the grey scale intensity value of the digital signal is in excess of level 10 (or 11–15), then the digital pseudocolor signal will override the analog signal, which will be blocked out, but otherwise the two signals will be summed and divided by two, or averaged. For these purposes, the control bit entries in the video look-up table memory 24 are set as follows:
A. Addresses 0 to 10 — average the two inputs
B. Addresses 11 to 15 — block the analog input Under these circumstances, if the pseudocolor output for the digital input is green for all addresses, then green lines will show on the screen for signal levels of digital input in the 11–15 range. However, for signal levels from the digital input of 1–10, mixtures of the green digital input and the analog signal input, whatever color it is, will appear on the screen. Thus wherever the analog signal is red, weaker green lines drawn on top will appear to be yellowish or orange in color. Thus, depending on the input signal levels, one pattern can be seen through the other.

Although a number of variations and modifications have been described herein, it will be appreciated that the invention is not limited thereto but encompasses all forms and expedients within the scope of the appended claims.

What is claimed is:
1. Apparatus for selectively combining signals representative of two electrically independent image sources to provide a combined signal suitable for controlling a display, comprising:
   means responsive to the signals for generating separate sequential bit coded representations thereof;
   means responsive to the data values contained in at least one of the sequential representations for generating sequential digital control signals for dynamically controlling the logical combination of individual bit coded representations in the sequences; and
   digital mixing means responsive to the control signals and to the bit coded representations for combining the representations in accordance with the function defined by the control signals.
2. The invention as set forth in claim 1 above, wherein said bit coded representations comprise separate sequences of signal combinations corresponding to successive picture elements, and wherein said system includes at least one look-up table means, said look-up table means containing control signal representations for different signal combinations, and wherein a first of the sequential bit coded representations is applied to address said look-up table means to generate modified digital signal patterns including digital control signals concomitant therewith.
3. The invention as set forth in claim 2 above, wherein said signal combinations applied to said look-up table means define a range of grey scale values, and wherein said look-up table means includes means for generating pseudocolor digital signals along with said control signals.

4. The invention as set forth in claim 3 above, wherein said system further comprises a second look-up table means, wherein the second of the sequential bit coded representations define a range of monochromatic grey scale values and are coupled to address said second look-up table means, and wherein said second look-up table means includes means for generating pseudocolor digital signals responsive thereto.

5. The invention as set forth in claim 4 above, wherein said digital mixing means comprises arithmetic and logic means for digitally combining, in accordance with logical and arithmetic functions, corresponding bits of the separate pseudocolor digital signals applied thereto, and wherein the two pseudocolor digital signals have identical bit pattern groupings for different colors.

6. The invention as set forth in claim 5 above, wherein the signals to be combined represent signals derived from raster scanned image sources, and wherein in addition said apparatus comprises display means coupled to said digital mixing means and responsive to combined bit coded representations therefrom.

7. An apparatus for combining raster scan images from first and second video sources represented by image source signals comprising:
addressable memory means containing coded patterns representing predetermined relationships between different intensities of different colors and control values at each addressable position;
means responsive to the signal variations in each source signal for addressing the memory means in correspondence to the value of the source signal, to provide output signals containing color data for both source signals and control data for at least one source signal; and
combining means responsive to the color data signals for each of the sources and responsive to the control data for logically combining said color data signals in accordance with predetermined logical functions corresponding to the control data.

8. The invention as set forth in claim 7 above, wherein said addressable memory means comprises a pair of memory arrays, each being addressed in response to a different image source signal and each providing digital output signals responsive to the particular addresses used.

9. The invention as set forth in claim 8 above, wherein said system includes means responsive to the different image source signals for generating pixel values in binary form, wherein said pixel value address the associated memory arrays, and wherein said system further logically combines corresponding pixels derived from the separate memory arrays in accordance with the predetermined function defined by the control data.

10. The invention as set forth in claim 9 above, wherein said means for combining includes means for adding, subtracting, averaging and blocking, in the alternative, the values of each pixel of a pair relative to the other.

11. The invention as set forth in claim 10 above, wherein each of the memory arrays includes a plurality of different color valued words, each at a different address and defining color and intensity values for the corresponding pixel, and wherein said system further includes means independent of the memory arrays for providing control data, and means responsive to the control data from the memory arrays and the independent means for selecting control data for combining the values of the pairs of pixels.

12. A system for providing a combined graphical display from raster scanned display signals that are of digital and analog origin comprising:
first means responsive to the display signals of digital origin for generating a first pixel sequence in conformity thereto;
second means responsive to the display signals of analog origin for generating a second pixel sequence in correspondence thereto;
first look-up table means including converted image values and control data at selected word addresses, said first look-up table means being responsive to one of the pixel sequences to generate as output a dependent sequence of control data and converted image data;
second table look-up means having at least a plurality of converted image values at different word addresses therein, said second table look-up means being responsive to the second of the pixel sequences for generating a dependent sequence of converted image data; and
means responsive to the two converted image data sequences and the control data for generating an output image sequence that represents both the image data sequence combined in accordance with predetermined functions established by the control data.

13. The invention as set forth in claim 12 above, wherein the output image sequence contains varying intensity levels of any one or more of three colors, and wherein the pixel sequences are dynamically combined on a pixel-by-pixel basis in real time, with control data being provided for each pixel pair.

14. The invention as set forth in claim 13 above, wherein the means responsive to the display signals of analog origin further include means for digitizing the display signal input to demarcate incrementally different levels within a variable range of levels.

15. The invention as set forth in claim 14 above, wherein said means for digitizing further includes means for establishing variable upper and lower range levels for the display signal, a plurality means for comparing the display signal to incrementally different thresholds within the range, and means responsive to the comparing means for providing digital signal patterns in response to the analog signal level.

16. The invention as set forth in claim 15 above, wherein at least one of said look-up table means includes means for selectively modifying the converted image data, and wherein said system further includes means external to the pixel sequences for generating control data, and multiplexer means for selectively controlling the means for generating an output signal source with either the control data from the table look-up means or the control data from the external means.

17. The invention as set forth in claim 13 above, wherein the display signals of digital and analog origin represent grey-scale values within a monochromatic range and wherein the first and second pixel sequences comprise digitally valued color data for each pixel, each having like bit groupings for three color values, and wherein the means for generating a combined output image sequence digitally combines the bit groupings of each color for each pixel pair in accordance with the function established by the control data for that pixel pair.

* * * * *